United States Patent

[11] 3,594,575

| [72] | Inventor | David J. Shoemaker |
| | | Columbus, Ohio |
| [21] | Appl. No. | 756,471 |
| [22] | Filed | Aug. 30, 1968 |
| [45] | Patented | July 20, 1971 |
| [73] | Assignee | Industrial Nucleonics Corporation |

[54] LINEARIZATION OF RADIATION GAUGES FOR MEASURING THE QUANTITY OF FLUIDIC MATERIALS IN CONTAINERS
15 Claims, 3 Drawing Figs.

| [52] | U.S. Cl. | 250/43.5, 250/83.6 |
| [51] | Int. Cl. | G01n 23/12 |
| [50] | Field of Search | 250/43.5 FL, 43.5 R, 43.5 D, 83.3 D, 83.6 |

[56] References Cited
UNITED STATES PATENTS

| 2,708,721 | 5/1955 | Ziffer | 250/43.5 |
| 2,933,601 | 4/1960 | Friedman | 250/43.5 |
| 3,098,154 | 7/1963 | Crump | 250/43.5 |
| 3,100,841 | 8/1963 | Reider | 250/43.5 |
| 3,230,363 | 1/1966 | Prellwitz | 250/43.5 |

Primary Examiner—Archie R. Borchelt
Assistant Examiner—Davis L. Willis
Attorneys—William T. Fryer, III and C. Henry Peterson ABSTRACT: Specifically disclosed is a method and apparatus for linearizing the output of a nuclear radiation tank level gauge. A plurality of radiation detectors are vertically spaced along one side of the tank to produce separate signals which are fed to a summing amplifier and a point source is located on the opposite side of the tank. The summing amplifier has individually adjustable input resistors whereby each signal is individually weighted to produce an amplifier output signal which is linearized with respect to the liquid level in the tank. For standardization, when the liquid level is below the top detector, the signal from the top detector is separately fed to the amplifier input in substitution for the multiple input signals, and the gain of the measuring system is adjusted to compensate for changed parameters of the system.

PATENTED JUL 20 1971  3,594,575
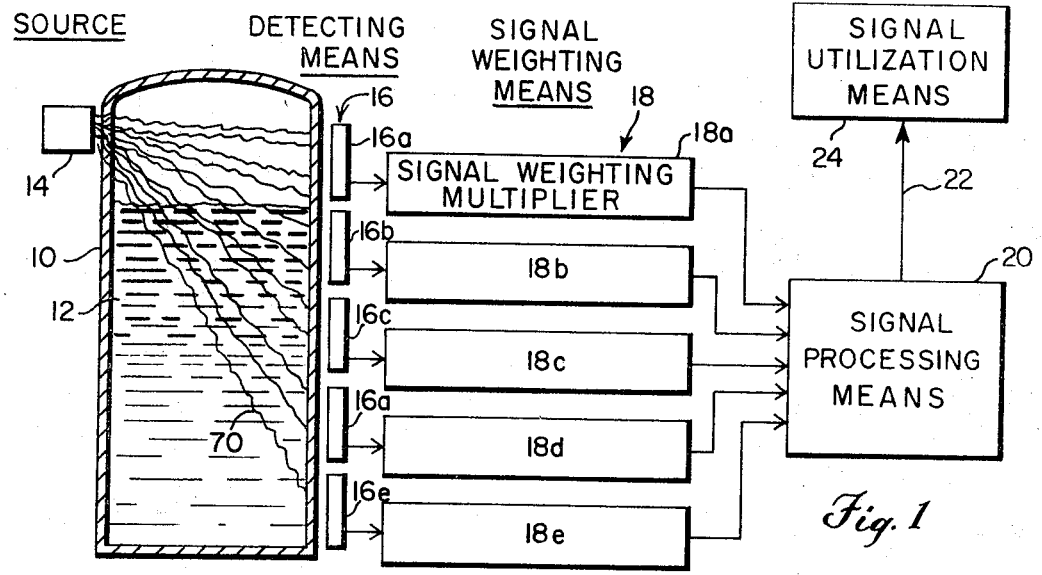
Fig. 1
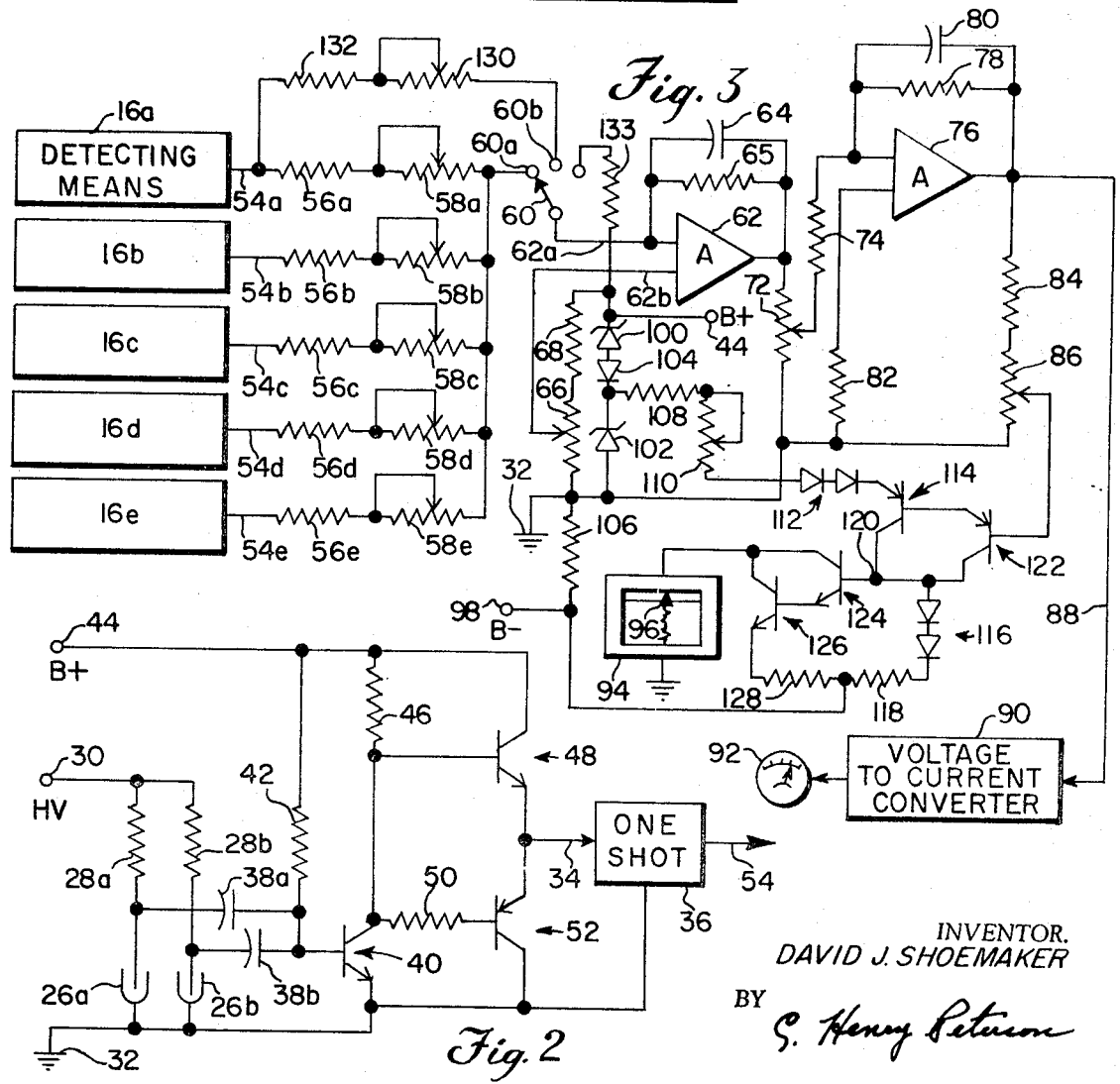
Fig. 3
Fig. 2
INVENTOR.
DAVID J. SHOEMAKER
BY G. Henry Peterson
AGENT

LINEARIZATION OF RADIATION GAUGES FOR MEASURING THE QUANTITY OF FLUIDIC MATERIALS IN CONTAINERS

This invention relates to methods and apparatus of the radiation fill-height gauging type for measuring the quantity of fluidic materials in tanks or other containers, and more particularly it relates to systems for linearizing the gauge signal output with respect to the quantity of material in the container. Still more specifically, the invention relates to methods and apparatus wherein a plurality of detecting means are positioned at different levels to provide a plurality of discrete output signals which are separately weighted in accordance with the relationship between the material quantity and the radiation received by a respective detector, and wherein the weighted signals are subsequently processed to provide a composite resultant signal which varies in a substantially linear way with the quantity of material.

The most commonly used radiation fill-height gauge inherently provides an output signal which is nonlinear with respect to the quantity of a material such as a liquid contained in a tank, in a manner exemplified by the apparatus of Ohmart U.S. Pat. No. 2,737,592. Friedman U.S. Pat. No. 2,933,601 has proposed an apparatus using a large number of on-off detectors, but when used with irregularly shaped containers the system is not linear with the quantity of fluid measured and does not interpolate between the discrete levels at which the detectors are placed. Proposals have been made to linearize the output signals from radiation tank level gauges by means of shaped absorbers, as in Crump U.S. Pat. No. 3,098,154, or by the use with one or more detectors of a plurality of sources of different intensities at computed locations as described in the article by Miller in *Aviation Week and Space Technology*, May 4, 1964, pages 74—80. Proposals have also been made to linearize the signals by means of electrical function generators as disclosed in Howard U.S. Pat. No. 2,952,774, which patent also discloses summing the linearized signals indicative of the quantity of fuel in a plurality of irregularly shaped tanks to indicate in a linear way the total quantity of fuel in all of the tanks. Another system for measuring the density and quantity of a liquid in a tank is disclosed in the Brunton U.S. Pat. No. 3,310,674.

Many fill-height gauges have used a single long detector; or a number of elongated detectors placed end to end along the length of level change and effectively connected in parallel to feed a single output circuit. Such arrangements, particularly the most common type using Geiger-Mueller tubes, can saturate at relatively low radiation levels, making them less sensitive to level changes.

In accordance with one arrangement of the present invention, there is provided a point source of penetrative radiation for irradiating the material in a container. A plurality of radiation detecting means are positioned adjacent to the tank at different levels corresponding to different values of the fill level. Each detector produces an output signal in accordance with the radiation received at the position of the detector. Each of the output signals is multiplied by a weighting factor which is selected in accordance with the relationship between the radiation received by the detector and the change in the material quantity producing the change in the radiation received by the detector. The individually weighted signals are then used to produce a combined effect by producing a resultant signal indicative of the material quantity, which resultant signal is substantially linearized with respect to the material quantity by proper selection of the weighting factors by which each individual signal is multiplied.

The use of separate detecting means and the combination of the output signals, provides a greater sensitivity to level change. An individual detecting means may saturate and not affect the sensitivity to change at another level. Thus, an overall improved efficiency occurs in the response of the gauge for a given change in level.

The objects of this invention are to provide an improved radiation fill-height-type measurement of the quantity of material in a container, to provide a system in which the output signal is substantially linearized, to provide an efficient system, sensitive to changes in level, to provide such a system which is readily standardized without the necessity for emptying the tank, which is simple and inexpensive and relatively easy to calibrate, to standardize and to maintain, and which is readily adapted for use with a variety of different types of output equipment such as recorders, microammeters or automatic controllers.

Further objects and advantages will become apparent in the following detailed description of certain preferred embodiments of apparatus for practicing the invention, taken in conjunction with the appended drawings in which:

FIG. 1 illustrates a tank containing a liquid having a variable fill level and having associated therewith a liquid quantity gauging apparatus according to the present invention, FIG. 2 shows the circuitry associated with one of the radiation detecting means of FIG. 1 according to a preferred embodiment of the invention, and FIG. 3 is a circuit diagram, partly schematic, of a complete material quantity gauge according to a preferred embodiment of the invention.

Referring to FIG. 1, there is illustrated a tank 10 containing a liquid 12 whose quantity is to be measured. While the tank shown is of regular circular cylindrical shape, it is understood that one of the advantages of the present invention is in its ability to measure the contents of irregularly shaped tanks. While the material illustrated is a liquid, it is apparent that other fluidic materials such as grain, granulated materials or other materials can be effectively measured. An interface can be measured, such as between a gas and liquid.

Positioned near the top of the tank is a point source 14 of penetrative radiation such as a radioactive source of gamma radiation. Depending on the size of the tank and the composition of the material 12, radioisotopes such as radium 226, cesium 137, cobalt 60 or bremsstrahlung sources may be used. An X-ray tube source can be used. While only one radiation source is illustrated, two or more point sources spaced along the vertical side of the tank may be appropriate for certain applications. It is understood that by a point source is meant that radiations emanate from a source at a single point as distinguished from an elongated source or a source spread over a broad area.

When a conventional elongated detector is placed along the opposite side of the tank from source 14, the detector output is nonlinear over a substantial range (reference Crump U.S. Pat. No. 3,098,154 and Ohmart U.S. Pat. No. 2,737,592). The change in radiation path length with level and the different amounts of material through which the radiation passes contributes to the nonlinear effect. The optimum output for the detector is a signal that varies linearly with changes in material quantity. A gauge with an elongated source of radioactive material extending along the tank side, instead of a point source, can also produce a nonlinear response due to nonuniform distribution of the radioactive material, variations in the tank wall thickness, or irregular tank configuration, for example. The present invention can be used to provide an output signal that varies linearly with level change for a level gauge having an elongated source.

According to one form of the present invention, positioned adjacent to the wall of the tank on the opposite side thereof from the source are a plurality of radiation detecting means 16, the individual units being shown at 16a—16e. As shown, the detecting means are closely spaced and aligned vertically along the wall diametrically opposite to the source. Other positioning arrangements may be appropriate for various shapes and sizes of tanks. For example, the detecting means may be more widely spaced or positioned in staggered, overlapping relationship depending on the number of detectors required to achieve the desired degree of linearity and total signal output. The source and detectors may be arranged on a large tank so that the radiation from the source to the detectors passes through only a sector of the tank. If necessary, either the source or sources or the detectors may be mounted inside the tank, and installed, for example, in suitable pipe wells therein according to conventional practice.

Individually connected to the detecting means are a plurality of signal weighting means 18, individually shown as signal weighting multipliers 18a—18e. Each of the detecting means as at 16a produces an output signal indicative of the quantity of radiation received at the location of the detecting means, and this output signal is fed to the respective weighting means as at 18a. In each of the weighting means the output signal from the respective detecting means is changed by a weighting factor selected in accordance with the relationship between fill level changes in the vicinity of the detector and the resultant changes in the detector output signal level. The respective weighting means for detecting means 16a—16e are shown as multipliers 18a—18e. Other signal changing means can be used.

The weighted output signals are then fed to a signal processing means 20 responsive to all of the weighted signals. Means 20 combines the total effect of the weighted signals to produce a resultant signal on line 22 which is indicative of the total amount of liquid 12 contained in tank 10. By proper selection and adjustment of the weighting factors used in multipliers 18a—18e, the resultant signal varies in a substantially linear way with the total quantity of liquid contained in the tank. The signal available on line 22 may be fed to any suitable utilization means 24 such as a liquid quantity or tank fill-height indicator, recorder or tank level controller.

FIG. 2 shows the circuitry of a preferred form of a detecting means which is used to perform the functions of any one of the detecting means 16a to 16e. As a sensing device, one or more Geiger-Mueller tubes are used. In the sample shown, there are two Geiger-Mueller tubes 26a and 26b, although the number of tubes will vary with the available radiation intensity levels and the required response time, taking into consideration the statistical nature of the radiation received at the detecting means location.

Detectors 26a and 26b are connected through respective detector load resistors 28a and 28b across a high voltage source of direct current represented by high voltage terminal 30 with one side at ground 32 potential. The Geiger-Mueller current pulses are converted to voltage pulses which are suitably conditioned, shaped, amplified and fed through a long cable 34 to a one-shot multivibrator 36 located in a remote electronics cabinet mounted at some distance from tank 12.

To this end, the junctions of the Geiger-Mueller tubes and their respective load resistors are coupled through capacitors 38a and 38b to the base of a suitable NPN transistor 40. The base of the transistor 40 is also connected through a resistor 42 to a B+ power supply terminal 44. The emitter of transistor 40 is grounded, and the collector is connected to the B+ voltage supply through a load resistor 46.

The junction of resistor 46 and the collector of transistor 40 is connected directly to the base of another NPN transistor 48, and the same junction is also connected through a current-limiting resistor 50 to the base of a PNP transistor 52. The emitters of the transistors 48 and 52 are commonly connected to cable 34. The collector of transistor 48 is connected to the B+ terminal 44, and the collector of transistor 72 is grounded.

Transistor 40 is normally biased into a heavily conducting state by the B+ voltage applied to its base through resistor 42 With transistor 40 heavily conducting, the potential at the bases of transistors 48 and 52 are at very low positive potential. Transistors 48 and 52 are thus biased so that a very large portion of the power supply voltage appears across NPN transistor 48, whereas PNP transistor 52 offers a very low impedance to ground 32. Thus the voltage applied to cable 34 is normally very low.

When a pulse of Geiger-Mueller current passes through one of tubes 26a or 26b, a negative-going voltage pulse is applied to the base of transistor 40, causing its collector current to drop to a low value and greatly increasing the positive voltage on the collector, as well as on the bases of transistors 48 and 52. The application of the positive voltage to the transistor bases causes the emitter-collector circuit of the NPN transistor 48 to have a very low impedance whereas the emitter-collector circuit of PNP transistor 48 assumes a high impedance. Hence the voltage applied to cable 34 rises rapidly to a large value, applying a sharp positive pulse which triggers one-shot multivibrator 36. The transistor circuit then quickly returns to its initial conditions.

For each triggering pulse applied to its input, multivibrator 36 produces a substantially square wave pulse of a constant amplitude and a constant width, so that if the voltage at the output 54 of the multivibrator is integrated, the result is a voltage proportional to the number of pulses received per unit time according to the intensity of radiation falling on Geiger tubes 26a and 26b.

Referring to FIG. 3, there are again shown the plurality of detecting means 16a—16e, providing respective outputs 54a—54e. These outputs are connected through respective dropping resistors 56a—56e and rheostats 58a—58e to a common junction point at one contact 60a of a switch having a wiper contact 60 which is movable to any one of three positions. In the operating position shown, switch 60 connects rheostats 58a—58e to one input terminal 62a of an integrated circuit operational amplifier 62. Amplifier 62 has a feedback circuit consisting of a parallel connected capacitor 64 and resistor 65 coupling the output of the amplifier to the input 62a.

Amplifier 62 is thus adapted to act as a summing amplifier. The summing resistor for the input signal from detecting means 16a is the combined resistance of resistor 56a and the adjusted resistance value of rheostat 58a. Similarly, the other resistors as at 56b and rheostats as at 58b constitute the input summing resistors for the other outputs of the other detecting means.

Another input 62b of amplifier 62 is supplied with a small positive voltage from the tap of a potentiometer 66, which is connected to the B+ voltage supply terminal 44 through a dropping resistor 68. The other end of potentiometer 66 is connected to ground 32. The adjustable tap of potentiometer 66 provides a variable suppression voltage to amplifier 62, which produces an output proportional to the difference between the currents supplied to its input terminals 62a and 62b.

Since the radiation from source 14 is absorbed exponentially in passing through the tank and its contents, the detecting means 16 commonly receives at least a minimum quantity of radiation even though the tank is completely filled with the liquid 12. The resulting extraneous signal is suppressed or bucked out by the suppression voltage from the properly adjusted potentiometer tap 66, so that the output signal from amplifier 62 is zero with a full tank and increases progressively and linearly as the tank level is reduced. It should be recognized that the signal suppression feature can be utilized with a gauge having an elongated source.

The contribution to the total amplifier output signal which is provided by the individual detecting means 16a—16e is determined by the signal weighting multiplier factors which are adjustable by rheostats 58a—58e. From FIG. 1, it is apparent that radiation from the source 14 which reaches the bottom detecting means 16e via the path taken by ray 70 is attenuated to a much larger extent than radiation which falls on detecting means 16b for example. This greater attenuation of the radiation occurs because of the much longer path length taken by ray 70, as well as because of the greater absorption of the radiation due to the length of the path, in fluid 12, which the rays must traverse in order to reach the detecting means. Accordingly, detecting means 16e inherently provides a smaller signal output than does detector 16b. Moreover, changes in fill level which effect changes in the output signal 54e produce significantly smaller changes in the signal than the changes which occur in a signal as at 54b as a result of equal fill level changes which affect the latter signal. Normally, in a regularly shaped tank, the multiplier rheostat adjustments result in a much larger value of the input summing resistance 56b and 58b than that of the input summing resistance 56e and 58e. Such may not be the case where the tank has an irregular shape or where different source arrangements are used so that the relative radiation intensities are different.

With the multiplying factors properly adjusted, and with the input terminal 62a being maintained at a constant potential by the feedback from the output of amplifier 62, the current flowing into input terminal 62a will be substantially directly proportional to the quantity of material 12 in tank 10, and the output voltage from amplifier 62 will be inversely proportional in a substantially linear way to the material quantity.

The values of capacitor 64 and resistor 65 are selected so that amplifier 62 has a relatively fast time constant and a relatively constant gain for the signal frequencies encountered at its input.

The output of amplifier 62 appears across a potentiometer 72 connected to ground 32. A portion of the output voltage from amplifier 62 is picked up on the tap of potentiometer 72 and fed to a resistor 74 at the input of a second integrated circuit operational amplifier 76. The output of amplifier 76 is fed back to the amplifier input terminal connected to resistor 74 through a feedback resistor 78 and feedback capacitor 80 combination. The values of resistors 74 and 78 and capacitor 80 are selected to provide a desired time constant for the tank level gauge. In a commercial device according to the invention, one or more additional input resistors 74, feedback resistors 78 and feedback capacitors 80 are provided, so that by the use of a suitable switching or jumpering arrangement not shown, a plurality of time constants may be provided to suit the instant operating condition. The second input of operational amplifier 76 is maintained at a substantially constant potential by connecting it to ground 32 through a resistor 82.

The output of amplifier 76 is connected to ground 32 through a dropping resistor 84 and a potentiometer 86. The output of amplifier 76 is a smoothed and linearized voltage which varies according to the quantity of material in tank 10. This resultant signal may be used for any desired purpose such as indicating, recording or controlling the quantity of material in the tank. To provide a simple indicator, the signal may be connected via line 88 to a conventional integrated circuit type of voltage to current converter 90 which drives a milliammeter 92 having its scale marked off in appropriate units of liquid quantity in tank 12. If desired, the output signal may be fed to an analog-to-digital converter for providing digital output indications or control signals, or the digital signals may be supplied to a central computer for inventory purposes.

The preferred embodiment of the invention further provides means for producing a standard current output such as that required by many signal processing equipments such as a commercial recorder 94. Such a device may require an input of exactly 1—5, 4—20 or 10—50 milliamperes for full-scale deflection of the recorder pen and pointer 96 for example, with respect to a scale marked off in the units of liquid quantity.

To provide the desired calibrated current outputs at appropriate impedance levels there is provided a special voltage to current converter. The power supply (not shown) which provides the B+ voltage on terminal 44, further provides a B− voltage on a terminal 98. These voltages supply power for the operational amplifiers 62 and 76 via conventional connections not shown. The power supply is well regulated by conventional means not shown and is additionally stabilized by a zener diode circuit shunted across the power supply terminals 44 and 98. This circuit comprises two zener diodes 100 and 102, a forward conducting diode 104 for temperature compensation, and a dropping resistor 106.

Connected between the junction of diodes 102 and 104 and the B− voltage supply terminal 98 is a circuit comprising a resistor 108, a rheostat 110, a pair of temperature compensating diodes 112, the collector circuit of a transistor 114, a further pair of temperature compensating diodes 116, and a precision resistor 118. Since the voltage across this circuit is constant, the current therein and the potential at a point 120, connected to the collector of transistor 114, is determined by the adjustment of rheostat 110 and the impedance of the collector circuit of transistor 114, whose base is in turn connected to the emitter of a transistor 122 also having its collector connected to a point 120.

The base of transistor 122 is connected to the adjustable tap of potentiometer 86 so that a selected portion of the output voltage from amplifier is applied to the base of transistor 122. The circuit using transistors 114 and 122 is arranged according to the well-known "common-emitter" Darlington configuration, and causes the voltage variations at point 120 to be accurately proportional to the variations in the output voltage of amplifier 76. The desired proportionality factor for calibration purposes is determined by the setting of potentiometer 86, which is adjusted to the proper value when the tank is empty and the output from amplifier 76 is at its maximum voltage. Rheostat 110 is the full-tank trimming adjustment which allows the potential at point 120 to be set to the proper value when the tank is full and the output from amplifier 76 is a minimum.

The voltage at point 120 is applied to a current amplifier comprising a Darlington double-emitter follower circuit using a pair of transistors 124 and 126. This amplifier provides the output current for operating recorder 94. The current through the recorder for a particular voltage at 120 is determined by the value of a precision load resistor 128. In a commercial tank level gauge according to the invention, it is found desirable to provide additional resistors of appropriate values which may be selected by switching or jumpering to suit the requirements of the various commonly used commercial recorders. With the proper resistor and with the proper adjustment of potentiometer 86 and rheostat 110, when the tank is empty the current supplied to the recorder has the value which causes the indicator 96 to read at the left end of the scale, and when the tank is full the current has the proper value to cause the indicator to read at the right end of the scale.

It is understood that the terms "full" and "empty" are relative terms which need not refer to the entire contents of the tank but only to a specific volume thereof to be gauged. For example, in a tank which is 40 feet high, it may be desired for the gauge to read out the fill level or quantity of material only over an 8-foot section, measured vertically, located at the top of the tank. In this case, the terms "empty" and "full" as previously used herein would refer to the condition of the volume or height portion of the tank on which the plurality of detectors are located.

Further according to the invention the apparatus of FIGS. 1 and 3 includes means for standardizing the gauge to compensate for various factors such as decay of the radiation source 14, changes in the electronic components due to aging, to compensate for buildup of foreign material on the walls of the tank and other factors affecting the accuracy of measurement. Moreover, according to the invention routine standardization of the apparatus does not require that the tank 12 be emptied of its contents. The preferred embodiment illustrated does require that the tank level be lowered approximately to the point shown so that no material 12 is interposed between the source 14 and the upper detecting means 16a.

Under this condition, the gauge is standardized by simply throwing switch arm 60 to another contact 60b and adjusting potentiometer 72 at the output of summing amplifier 62 until an empty tank reading or other selected reading is obtained on indicator 92 or recorder 94. Throwing switch 60 to contact 60b disconnects the summing amplifier terminal from the operating signal input summing resistors and connects it instead to a standardizing input resistance comprising rheostat 130 and resistor 132, to which is applied only the one signal output on line 54a from the top detecting means 16a which is uncovered by the material 12. When the gauge is initially calibrated, and with the proper empty reading being obtained on the recorder or indicator with the gauge in normal operation, the rheostat 130 is adjusted so that when the switch 60 is switched to contact 60b the same empty reading or other specific desired reading is obtained. Then at any later time when the liquid level is below the top detector 16a, the gauge may be standardized by throwing switch 60 to contact 60b and adjusting the voltage gain of the instrument by adjusting potentiometer 72 until the same specific reading is obtained as before.

In a third position of switch 60, the constant B+ voltage can be applied to the input of amplifier 62 through resistor 133. Thereupon the signals at various check points in the system can be compared with values previously recorded for circuit testing purposes.

It should be recognized that the standardization method can be used for a tank level gauge using an elongated source and a plurality of detectors.

If desired, the gauge may be adapted to be standardized using a special detecting means which is never covered by the fluid in the tank. This system may be less satisfactory, since the standardization may not account for any build up of foreign material on the walls of the tank which are normally in contact with the liquid. The preferred standardization scheme does not take into account the fact that the build up of extraneous materials on the top detector may not be the same as at the lower levels. However, full accuracy can be restored by standardizing the system at very infrequent intervals with the tank empty to account for the long term differential build up while normally using the regular standardization procedure at more frequent or periodic intervals to closely maintain the accuracy in the interim.

While the invention has been shown and described in connection with the construction and operation of specific apparatus, such showing and description is illustrative only and not restrictive, since obviously many changes, modifications and outwardly different embodiments can readily be made without departing from the spirit and scope of the invention as is set forth in the appended claims. In the described arrangement, the pulse rate signals are converted to analog voltage signals which are multiplied by appropriate weighting factors using the signal attenuating rheostats 50a—50e. Obviously, the pulses from the detecting means can be counter digitally, and appropriate digital multiplication may be used to weight the signals which may then be combined, say, by digital averaging. Likewise, the multiplication could be performed on the detecting means output pulses by pulse rate multiplication, say, by passing the pulses through a recycling pulse counter having a suitable feedback arrangement so that only nine out of 10, or three out of five, or every other pulse, for example, will be transmitted to the signal-processing means 20. It is apparent also that a pulse-type detector arrangement such as that illustrated using Geiger-Mueller tubes can be replaced by another detector arrangement such as one using ionization chambers and electrometers, for example. At least to some extent, signal-weighting factors can be determined by selecting the number or size of the basic detecting elements, such as the Geiger-Mueller tubes used in the respective signal channels. Many other modifications will be apparent to one skilled in the art.

What I claim is:

1. Apparatus for gauging the quantity of a fluidic material in a container having a variable fill level, comprising
  a source of penetrative radiation for irradiating said material,
  a plurality of detecting means positioned at different levels corresponding to different values of said fill level and further positioned so that the respective detecting means are adapted to receive quantities of radiation which have interacted with material in different portions of the volume of said container, each of said quantities of radiation being subject to change with certain changes in said variable fill level whereby each detecting means produces a detector output signal indicative of its respective received radiation quantity,
  a plurality of signal-weighting means each receiving one of said detector output signals for changing its respective one signal by a selected weighting factor to produce a weighted output signal, and
  means responsive to a plurality of said weighted signals for producing a resultant signal indicative of said quantity and substantially linearized with respect thereto by proper selection of said weighting factors.

2. Apparatus as in claim 1 wherein each of said signal-weighting means comprises means for multiplying its respective one signal by a selected weighting factor to produce a weighted output signal.

3. Apparatus as in claim 1 wherein said signal responsive means comprises means for summing said weighted signals.

4. Apparatus as in claim 3 wherein said detecting means comprises means for producing analog signals constituting said detector output signals with amplitudes proportional to the radiation received by the respective detecting means, and
  wherein said summing means comprises an operational amplifier.

5. Apparatus as in claim 4 wherein each of said weighting means according to claim 1 multiplies its respective one signal by a selected weighting factor to produce a weighted output signal and comprises input impedance means for said summing amplifier, the value of said impedance means being approximately inversely proportional to said weighting factor.

6. Apparatus as in claim 5 wherein each of said impedance means is continuously adjustable to provide a continuum of selected values for said weighting factors.

7. Apparatus as in claim 1 wherein one of said detecting means is positioned to receive radiation from said source which has not interacted with said material at at least certain values of said fill level, said apparatus further including standardizing means comprising
  means for substituting the output signal from said one detecting means for the plurality of said detector output signals whereby said responsive means produces a second resultant signal indicative of the radiation received by said one detecting means, and
  means for adjusting said responsive means to obtain a predetermined value for said second resultant signal to as to restore the initial calibration accuracy of said quantity indicative resultant signal.

8. The method of measuring the quantity of a fluidic material in a container having a variable fill level, comprising the steps of:
  irradiating said material with penetrative radiation,
  detecting at different levels quantities of radiation which have interacted with material in different portions of the volume of said container,
  generating separate signals indicative of said detected radiation quantities,
  forming a combination of said signals to produce a resultant signal, and
  separately weighting the effects of said generated signals in said combination to linearize said resultant signal with respect to variations in said quantity.

9. Apparatus as in claim 1, wherein said responsive means includes means for canceling out only the portion of said resultant signal that is due to radiation received by said detecting means when said container is full.

10. The method of standardizing a gauge measuring the quantity of a fluidic material in a container having a variable fill level, comprising the steps of:
  irradiating said material with penetrative radiation,
  detecting at different levels quantities of radiation which have interacted with material in different portions of the volume of said container,
  generating separate signals indicative of said detected radiation quantities,
  forming a combination of said signals to produce a resultant signal, weighting the effects of said generated signals in said combination to linearize said resultant signal with respect to variations in said quantity, lowering the tank level so that no material is present at one of the upper radiation detecting levels, leaving the material at a lower radiation detection level, comparing the resultant signal due to radiation received at said upper detecting level with a predetermined value, and adjusting said signal combination to standardize said gauge to obtain said predetermined value.

11. Apparatus for gauging the quantity of a fluidic material in a container having a variable fill level, comprising a point source of penetrative radiation for irradiating said material to be positioned along one side of said container, a plurality of detecting means to be positioned at different levels corresponding to different values of said fill level along the opposite side of said container and further positioned so that the respective detecting means are adapted to receive quantities of radiation which have interacted with material in different portions of the volume of said container, each of said quantities of radiation being subject to change with certain changes in said variable fill level whereby each detecting means produces a detector output signal indicative of its respective received radiation quantity, a plurality of signal-weighting means each receiving one of said detector output signals for changing its respective one signal by a selected weighting factor to produce a weighted output signal, and means responsive to a plurality of said weighted signals for producing a resultant signal indicative of said quantity and substantially linearized with respect thereto by proper selection of said weighting factors.

12. Apparatus as in claim 11 wherein one of said detecting means is positioned to receive radiation from said source which has not interacted with said material at at least certain values of said fill level, said apparatus further including standardizing means comprising means for substituting the output signal from said one detecting means for the plurality of said detector output signals whereby said responsive means produces a second resultant signal indicative of the radiation received by said one detecting means, and means for adjusting said responsive means to obtain a predetermined value for said second resultant signal so as to restore the initial calibration accuracy of said quantity indicative resultant signal.

13. Apparatus as in claim 11, wherein said responsive means includes means for canceling out only the portion of said resultant signal that is due to radiation received by said detecting means when said container is full.

14. The method of measuring the quantity of a fluidic material in a container having a variable fill level, comprising the steps of:

irradiating said material with a point source of penetrative radiation, detecting at different levels quantities of radiation which have interacted with material in different portions of the volume of said container, generating separate signals indicative of said detected radiation quantities, forming a combination of said signals to produce a resultant signal, and separately weighting the effects of said generated signals in said combination to linearize said resultant signal with respect to variations in said quantity.

15. The method of standardizing a gauge measuring the quantity of a fluidic material in a container having a variable fill level, comprising the steps of:

irradiating said material with a point source of penetrative radiation, detecting at different levels quantities of radiation which have interacted with material in different portions of the volume of said container, generating separate signals indicative of said detected radiation quantities, forming a combination of said signals to produce a resultant signal, weighting the effects of said generated signals in said combination to linearize said resultant signal with respect to variations in said quantity, lowering the tank level so that no material is present at one of the upper radiation detecting levels, leaving the material at a lower radiation detection level, comparing the resultant signal due to radiation received at said upper detecting level with a predetermined value, and adjusting said signal combination to standardize said gauge to obtain said predetermined value.